March 5, 1968  W. A. HEIDMAN, JR  3,372,374

AUTOMOTIVE STOP LIGHT AND TURN SIGNAL CIRCUITS

Filed Dec. 28, 1964

INVENTOR.
William A. Heidman Jr.
BY
ATTORNEY.

United States Patent Office 3,372,374
Patented Mar. 5, 1968

3,372,374
AUTOMOTIVE STOP LIGHT AND TURN
SIGNAL CIRCUITS
William A. Heidman, Jr., 1139 Lakeside Drive SE.,
Grand Rapids, Mich. 49506
Filed Dec. 28, 1964, Ser. No. 421,267
7 Claims. (Cl. 340—81)

ABSTRACT OF THE DISCLOSURE

Stop light and turn signal circuits for vehicles in which a manually operable switch is connected to alternatively disconnect the brake switch from the stop lights and connect a second emergency flasher to the stop lights. A variation includes door operated switches in circuit with the emergency flasher.

---

This invention relates to improvements in automotive signal circuits. The principal objects of this invention are:

First, to provide a circuit which will selectively and alternatively actuate all of the front and rear turn signal lights of a vehicle either as simultaneously and constantly energized stop signals in response to actuation of the existing brake switch, or as intermittently flashing turn signals on one side of the vehicle and at its front and rear, or simultaneously and intermittently flash all turn signal lights independently of the actuation of the brake switch.

Second, to provide a circuit or the brake actuated stop lights and turn signal lights of a vehicle which will permit the lights to be alternatively energized through the brake actuated switch or intermittently upon opening a door of the vehicle or intermittently by actuation of a selectively operable switch.

Third, to provide a wiring system having the foregoing capabilities which can be adapted to existing stop and turn signal systems of automotive vehicles with a minimum of additional structure and wiring.

Fourth, to provide an improved form of signal light system for automotive vehicles which will provide additional indicators at the front and rear of the vehicle as to the intentions of the driver of the vehicle for additional safety.

Fifth, to provide a flasher system for existing signal lights of a vehicle which can be connected to existing turn signal switches to provide for flashing as a safety warning signal of lights at the front and rear of the vehicle upon opening a door of the vehicle or upon selective actuation of an emergency warning signal switch without interferring with the normal turn signal function of existing signal systems.

Sixth to provide a signal system for the front and rear turn signals and stop lights of a vehicle which will simplify the structure of the turn signal switch.

Other objects and advantages of the invention will be apparent from a consideration of the following description and claims. The drawings, of which there is one sheet, illustrate two practical forms of signal circuits embodying the invention.

Figure 1:
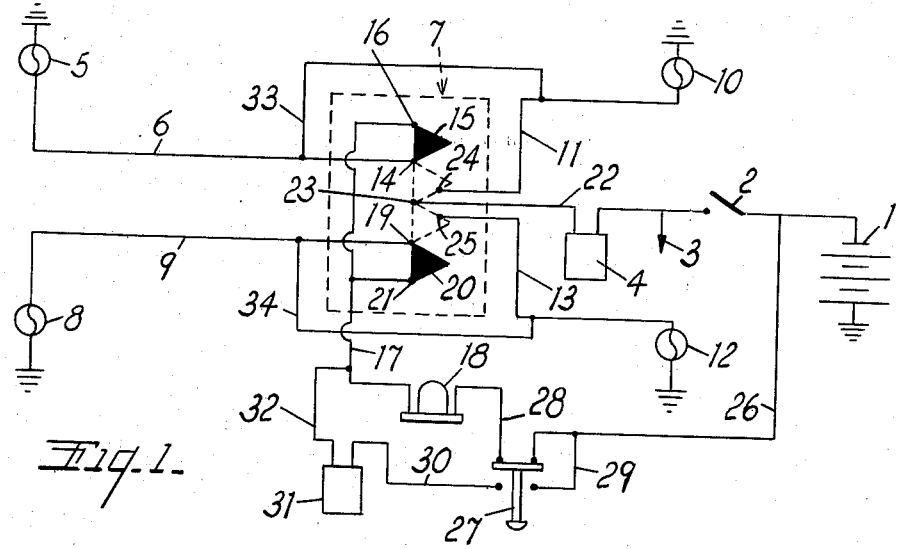
FIG. 1 is a first practical form of circuit modification of the stop and turn signals of vehicles to provide for both stop and turn signal illumination at the front and rear of the vehicle and alternatively permit emergency flashing of both stop and front turn signals independently of actuation of the brake switch in the stop light circuit.

In the drawing the battery of a vehicle is indicated at 1 connectable through the ignition switch 2 to the ignition circuit 3 and to the intermittent flasher 4 of the standard turn signal commonly in use. The left rear stop light and turn signal is indicated at 5 connected through one circuit or conductor 6 to the turn signal switch indicated generally at 7. The right rear stop light and turn signal 8 is connected to the turn signal through the circuit or conductor 9. A left front turn signal light 10 is connected to the turn signal by the circuit conductor 11 and the right front turn signal 12 is connected to the turn signal switch through the conductor 13.

The turn signal switch assembly 7 consists of a first terminal 14 connected to the conductor 6 and connectable by the moveable contact 15 to the terminal 16 to connect the rear stop and turn light 5 to conductor 17 extending to the brake actuated switch 18. Corresponding to the left side of the vehicle a terminal 19 connected to the conductor 9 is selectively connected by the moveable contact 20 to the terminal 21 and the same conductor 17 so that both rear lights 5 and 8 may be enerized by closing of the brake switch 18 as a stop signal as is common. For turn signal purposes the turn signal flasher 4 is connected by conductor 22 to terminal 23 and conductor 11 is connected to terminal 24. Conductor 13 is connected to terminal 25. The turn signal switch assembly selectively moves one of the contacts 15 or 20 to connect the associated conductors 6 and 11 or 9 and 13 to the terminal 23 to produce the flashing turn signal at the front and rear of one side of the vehicle while disconnecting the circuit 7 from the brake switch therefrom as is common.

The brake switch 18 is normally connected through the conductor 26 to the battery ahead of the ignition switch so that the stop lights are operative without closing the ignition switch. The present invention provides a selectively operable switch 27 in series in the conductor 26 that alternatively connects the battery through the conductor 28 to the brake switch or through the conductors 29 and 30 through a second flasher or current interrupting device 31. It will be understood that switch 27 alternatively completes the circuit through conductors 26 and 28 or conductors 29 and 30. The second or emergency signal flasher 31 is connected by a conductor 32 to the conductor 17 and thus is selectively connected around the brake switch 18 when the circuit through the brake switch is interrupted.

In addition to the changes in the brake switch circuit the invention provides a conductor 33 permanently connecting the conductors 6 and 11 to the left turn signal lamps and a conductor 34 permanently connecting conductor 9 and 13 to the right turn signal lights. In the foregoing it will be seen that with switch 27 in the normal position illustrated actuation of the brake switch 18 will energize both rear stop lights in the usual manner and will in addition energize both front turn signal lights 10 and 12 with a steady signal which will indicate to persons observing the vehicle from either the front or the rear that the brakes have been applied and that the driver intends to slow down or stop or remain stopped. Actuation of the turn signal 7 operates both front and rear turn signal lights in the ususal manner giving the currently recognized signal of intention to turn. Should the switch 27 be pulled or moved downwardly to the alternate conductors 29 and 30 a circuit is completed to the turn signal 7 independently of the brake switch circuit and the emergency flasher 31 provides continuous flashing of all four turn signal lights which can not be overridden by actuation of the brake switch. In an emergency the driver may apply the brakes to stop or hold his vehicle in position while exhibiting emergency flashing signals for both the front and rear. The emergency nature of the signal is distinguishable from the normal turn signal in that the lights flash at both sides of the front and rear instead of only at one side.

Figure 2:
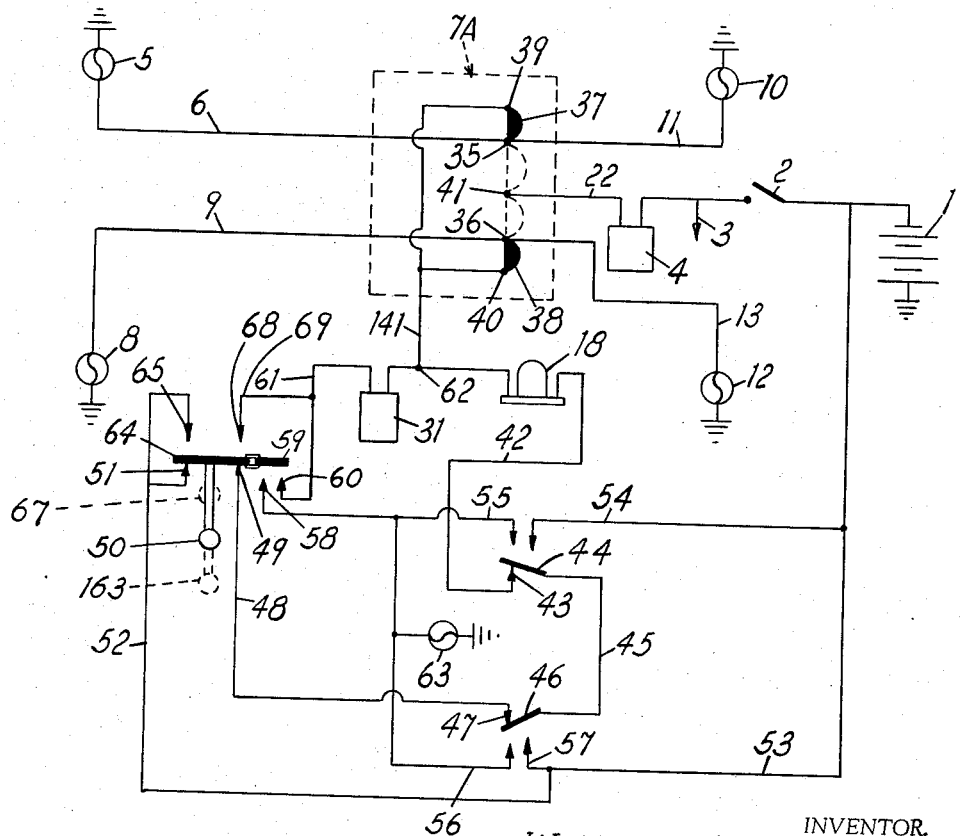
FIG. 2 is a shematic wiring diagram of a modified form of the signal system which ties the alternative signal circuits through door operated switches of the vehicle and which permits simplification of the turn signal switch.

FIG. 2 schematically illustrates a modified form of the signal system in which the rear stop and turn signals and the front turn signals are connected to the turn signal switch by the same conductors as in FIG. 1. The same turn signal flasher-ignition switch and battery connections are provided but the turn signal 7A is somewhat modified and simplified in that the conductors 6 and 11 are connected to a common terminal 35. Conductors 9 and 13 are similarly connected to a common terminal 36 and the selectively moveable contacts 37 and 38 of the turn signal switch are selectively moveable to connect these terminals with terminals 39 and 40 or with the common terminal 41 of the turn signal conductor 22. Two terminals of the turn signal switch assembly are thus eliminated.

As in the first circuit, terminals 39 and 40 are connected to conductor 141 extending to the brake switch 18 but instead of being connected to a manually operable switch, the brake switch 18 is connected through the conductor 42 to a terminal 43 on which switch 44 closes when a door of the vehicle which operates the switch is closed. Switch 44 is connected in series by conductor 45 with another door switch 46 which closes on terminal 47 in the closed position of that door. Terminal 47 is connected through conductor 48 to terminal 49. Terminal 49 is connectable by a selectively manually operable switch 50 to terminal 51 and conductor 52 in both the normal, outwardly or downwardly moved position of switch 50 indicated by the dotted lines at 163, and in an intermediate position shown in full lines. Conductor 52 connects with conductor 53 and the battery ahead of the ignition switch so that with the vehicle doors closed and switch 50 in normal outward position 163, normal stop light and turn signal operation of the signal lights at both the front and rear of the vehicle is effected. Operation of the turn signal 7A produces the usual flashing of turn signals on one side of the vehicle independently of stop light action which may be exhibited at both the front and rear of the other side of the vehicle.

Switch 44 when opened by one door completes a circuit between conductors 54 and 55 while opening of the other door switch 46 completes a circuit between conductors 56 and 57. Both conductors 56 and 57 connect to a terminal 58 selectively connectable by a separate contact 59 operated by the previously described switch 50 with the terminal 60 and conductor 61 and the emergency flasher 31 in the normal adjusted position 163 of switch 50 indicated by the dotted line position illustrated so that opening of either door will energize the second emergency flasher 31 connected to the conductor 61 and conductor 141 at 62 for emergency flashing of all four signal lights as in the first form of the circuit shown in FIG. 1. Opening either door will also energize an interior light 63 connected to ground from conductor 56 and this light may be a signal indicating that either one of the door switches 44 or 46 is open, and also that switch 50 is in normal position for brake and turn signal operation. Alternatively, light 63 can be an interior courtesy light which lights up as any door is opened to assist entry into the vehicle while the flashing of the four exterior lights warns approaching motorists of the entry or exit of a passenger from the vehicle. Opening either door breaks the circuit to the conductor 42 and brake switch 18 so the emergency flash signal is not over-ridden by application of the brake.

The first inwardly adjusted position of switch 50 indicated by the full line position of its handle disconnects contact 59 from terminals 58 and 60 in conductor 61. At the same time, contact 64 maintains the connection between terminals 49 and 51. In this second position, the control of the door operated switches 44 and 46 over the emergency flasher is interrupted, but the supply of current to the brake switch through conductor 42 is retained so long as the doors are closed. In this position of switch 50 normal brake or stop light action is continued for normal driving but the doors of the vehicle may be left open, should that be desired, without actuating the emergency flasher.

A third or emergency inwardly adjusted position of switch 50 indicated at 67 connects contact 64 between terminal 65 and 68 and breaks contact between terminals 51 and 49. Terminal 68 is connected by conductor 69 to the conductor 61 and the emergency flasher. This provides automatic emergency flashing and warning action corresponding to downward or outward adjustment of switch 27 in FIG. 1, when the brake switch is opened. This permits a driver to brake to a stop in a moving emergency and have all the flashers come on without being over-ridden by the brake or stop lights. The full inwardly pushed position is a natural position to locate under the stress of a moving emergency. The emergency flasher will remain on after the vehicle stops and doors are opened.

The modified circuit in FIG. 2 provides all of the safety signal advantages of the circuit in FIG. 1 plus the capability of actuating the emergency or warning flashers upon opening of any door, plus simplifiaction of the turn signal structure and the circuit shown in FIG. 2 and is therefore preferred for original installations, whereas the circuit shown in FIG. 1 is preferable for modification of existing automotive signal circuits. The new elements of both circuits are readily adaptable to the existing brake and turn signal wiring and are therefore relatively inexpensive to install or incorporate into the wiring system of a vehicle.

What is claimed as new is:

1. In combination with an automotive vehicle having a battery, an ignition switch, right and left turn signal lights at the rear, stop light circuits connectable between said battery and said rear lights, a brake actuated switch common to said circuits and connectable to said battery, a first flasher connectable to said battery through said ignition switch and a turn signal switch arranged to selectively interrupt one of said circuits and connect the interrupted circuit and the corresponding turn signal light to said flasher, an emergency flasher system comprising a second flasher connectable in parallel around said brake switch in said circuits, a selectively operable switch arranged to alternatively interrupt the connection between said battery through said brake switch and concurrently complete the connection through said second flasher around said brake switch.

2. An emergency flasher system as defined in claim 1 in which said selectively operable switch is operated by opening and closing of a door and is further connected through a second door operated switch in series and arranged to be operated by opening a door on the opposite side of said vehicle, each of said door operated switches being arranged when a door is opened to close in parallel circuits from said battery to said second flasher, and connections through a second selectively and manually operable switch connectable from said battery alternatively to said series through said door operated switches or directly to said second flasher.

3. An emergency flasher system as defined in claim 2 in which said second selective switch has a contact movable with the switch to an intermediate position to disconnect terminals connecting said parallel circuits from said battery to said emergency flasher while maintaining the connection from said battery to said series circuit to said brake switch.

4. An emergency flasher system as defined in claim 1 in which said turn signal switch has common terminals connected on each side of the vehicle to turn signal lights at the front and rear on each side of the vehicle, said common terminals being selectively and alternatively connectable by said turn signal switch with said brake switch or said first flasher.

5. An emergency flasher system as defined in claim 2 in which said turn signal switch has common terminals connected on each side of the vehicle to turn signal lights at the front and rear on each side of the vehicle, said common terminals being selectively and alternatively connectable by said turn signal switch with said brake switch or said first flasher.

6. In combination with an automobile vehicle having right and left signal lights at the front and rear thereof,
conductors connecting the front and rear light on each side of the vehicle,
a battery,
an ignition circuit connectable to said battery through an ignition switch,
a brake operated switch,
a turn signal switch and first flasher connected to be energized from said ignition circuit and adapted to connect either of said conductors to said first flasher to the exclusion of said brake switch,
a second flasher connected to said battery ahead of said ignition switch,
and means including a selectively operable switch positioned to be actuated by opening and closing of a door of the vehicle adapted to selectively energize said conductors through said brake switch and turn signal switch or energize said conductors from said second flasher to the exclusion of energization of the conductors by said brake switch.

7. In combination with an automotive vehicle having right and left signal lights at the front and rear thereof,
conductors connecting the front and rear lights on each side of the vehicle,
a battery,
an ignition circuit connectable to said battery through an ignition switch,
a brake operated switch,
a first flasher connected to be energized from said ignition circuit and adapted to connect either of said conductors to the exclusion of said brake switch,
a second flasher connected to said battery ahead of said ignition switch,
and means including a selectively operable switch adapted to selectively energize said conductors through said brake switch and turn signal switch or energize said conductors from said second flasher to the exclusion of energization of the conductors by said brake switch.

References Cited

UNITED STATES PATENTS

| 2,846,665 | 8/1958 | Hollins | 340—81 |
| 3,182,289 | 5/1965 | Rossi | 340—81 |
| 3,185,961 | 5/1965 | Du Rocher | 340—76 |
| 3,263,211 | 7/1966 | Heidman | 340—81 |

THOMAS B. HABECKER, *Acting Primary Examiner.*

NEIL C. READ, *Examiner.*

A. H. WARING, *Assistant Examiner.*